United States Patent [19]

Palmer

[11] 4,219,009

[45] Aug. 26, 1980

[54] VENTED SOLAR PANEL

[76] Inventor: David W. Palmer, 109 Phillips Ave., Rockport, Mass. 01966

[21] Appl. No.: 935,547

[22] Filed: Aug. 21, 1978

[51] Int. Cl.[2] ............................ F24J 3/02; F24F 7/00
[52] U.S. Cl. ................................... 126/422; 137/79; 165/81; 236/49
[58] Field of Search ............... 126/270, 271; 237/1 A; 165/16, 40, 81; 236/49, 93 R, 93 A; 137/68 R, 69, 70, 71, 75, 79; 251/294; 98/1

[56] References Cited

U.S. PATENT DOCUMENTS

| 246,626 | 9/1881 | Morse | 126/270 |
|---|---|---|---|
| 2,109,114 | 2/1938 | Kerr | 251/294 |
| 2,776,796 | 1/1957 | Mosely | 236/93 A |
| 3,690,336 | 9/1972 | Drum | 137/75 |
| 3,726,299 | 4/1973 | Wheatley | 137/75 |
| 3,943,911 | 3/1976 | Yu | 126/271 |
| 3,949,732 | 4/1976 | Rienes | 126/422 |
| 4,026,267 | 5/1977 | Coleman | 126/270 |
| 4,029,258 | 6/1977 | Groth | 126/270 |
| 4,043,317 | 8/1977 | Scharfman | 126/270 |
| 4,046,134 | 9/1977 | Scott | 236/49 |
| 4,058,109 | 11/1977 | Gramm | 126/270 |
| 4,063,545 | 12/1977 | Hapgood | 165/11 |
| 4,150,659 | 4/1979 | Buckley | 126/422 |

Primary Examiner—James C. Yeung
Assistant Examiner—Daniel O'Connor
Attorney, Agent, or Firm—Peter N. Jansson

[57] ABSTRACT

A solar panel having venting gates at opposite ends of an air plenum defined between a collector element and a protective, light-transmissive cover and having a wax thermal actuator for both the gates and flexible force-transmitting linkages between the actuator and each gate to operate the gates simultaneously. Preferred embodiments include certain linkages, gates and gate control apparatus, and certain structural relationships of the actuator with the collector element to achieve desired heat transfers. In certain embodiments, the actuator is part of a heat-sensing module which receives a multiplicity of heat inputs. The collector element in certain highly preferred embodiments is of plastic. A glazed solar panel having a venting gate controlled by a temperature-responsive wax thermal actuator linked thereto.

39 Claims, 5 Drawing Figures

VENTED SOLAR PANEL

BACKGROUND OF THE INVENTION

This invention relates to solar panels, such as panels for heating water and the like, and, more particularly, to solar panels which have vented air plenums, typically above the collector element, to eliminate overheating.

Solar panels have been used to collect solar energy for space heating, water heating and a variety of other applications requiring heat energy. Solar panels of this type typically have a collector plate or other collector element which is of a color (black or other dark color) and/or texture to maximize absorption of solar radiation. Such collector elements have fluid conduits, often a large number of parallel conduits, disposed in efficient conductive heat-transfer relation thereto. Often the conduits are formed integrally with the collector element. A fluid, usually a liquid, flows (aided normally by a remote pump or fan) through the conduits and is heated by taking heat from the collector element. This heated fluid may be used in a variety of ways, either directly (for example, as domestic hot water) or for a subsequent heat transfer for some other purpose such as space heating. The fluid passing through such conduits may be referred to as the "working fluid".

Often, particularly in cold climates, a glazing, that is, a solar energy-transmitting cover, is placed over the collector element in closely spaced relation thereto. This cover is usually supported by a frame of some sort, and forms an air plenum chamber which isolates and insulates the collector element from the environment to minimize undesirable heat loss. The instant invention is applicable to solar panels of this general type and to any solar panel which has an air plenum adjacent to a collector element. The invention relates to the need to vent such air plenum whenever destructive overheating must be prevented.

Such solar panels may be mounted on a roof or other structure in position to receive solar radiation. Panels of this type are often generally flat and rectangular, and are often mounted at a substantial tilt or angle with respect to the horizontal to be facing the sun as directly as possible. In many cases, several panels may be ganged together to increase collection of solar radiation.

A major problem with covered solar panels of the type described is excessive heating. If the temperature of the solar collector and/or the entire panel rises above certain levels, a great deal of damage can occur. Of course, the temperatures which are tolerable depend on the materials and construction of the panel. Differing thermal expansion coefficients of materials used in the panel may result in the breaking of bonds and joints. And, if the working fluid in the conduits vaporizes, the pressure may increase to the point of rupturing the conduits, thus causing leakage in the system. Very high temperatures for long periods of time may cause permanent distortions in the collector element (particularly metal collector elements) and related parts and can even cause melting of plastics and combustion of combustible materials.

Overheating of a solar panel can arise from several failures in the system, such as a blockage or other failure in the circulation of the working fluid, pump failure, power failure, or malfunctioning of the solar panel control system. Various systems have been made to protect solar panels from overheating. However, many of these systems have failed because of electrical power outages or other problems.

Attempts have been made to develop means of venting the air plenum between the solar collector and the cover when overheating occurs to allow the hot air adjacent to the overheated collector element to escape from the air plenum and be replaced by cooler air from the atmosphere, thus retarding heat buildup and allowing the collector element to cool to acceptable temperature levels. None of the efforts prior to the instant invention, however, have resulted in a practical and effectively operating vented solar panel.

In certain solar panels of the prior art, temperature-responsive bimetal valves or dampers have been placed at opposite ends (the lower and upper ends, considering panel tilt) of the panel. Such arrangements have been unsatisfactory for several reasons. In such panels, the temperature-responsive valves at either end operate separately rather than in a coordinated manner.

The opening of such valves at widely differing times occurs because of the temperature differences between the lower and upper ends of the panel. In many cases, the isolation of the collector element of such a vented panel would be breached without allowing proper venting; such breach, while serving no useful purpose, would allow some unwanted ingress of dirt or dust, particularly near the opened valve. In other cases, venting would stop prematurely because of premature closing of one of the temperature-responsive valves, before sufficient cooling occurs. While the lack of coordination of separately operable venting valves at opposite ends of the solar panel could be avoided by leaving one end of the solar panel open at all times, such would only reduce the efficiency of panel operation and exacerbate the problem of ingress of dust and dirt.

A further problem with some of such temperature-responsive valves is that, even when valves at both ends are open, the venting is insufficient to allow flow of air across substantially the entire width of the solar panel. Instead, flow may occur primarily near the line extending between the bimetal valves at either end of the panel, leaving other portions of the panel substantially uncooled.

Another drawback of the bimetallic valve venting devices is that the bimetallic temperature sensors are at or near the opening, normally an integral part thereof. No flexibility of sensor placement is available.

Another major problem of prior glazed solar panels is their high cost. Glazed solar panels are generally of expensive materials and construction. The collector elements are often of expensive metal materials chosen to avoid corrosion. Some glazed solar panels of the prior art have complicated, powered control systems to prevent problems. Such systems are generally quite expensive, and are also subject to failure because of power outages.

To reduce high panel cost, plastic collector elements could be used. Plastic collector elements, however, undergo much greater dimensional changes than similarly shaped metal elements, and use of such elements would place constraints on panel construction, and on any control systems forming a part thereof.

In summary, there has been need for a relatively low-cost, efficiently operating, and practical vented solar panel. There has been need for a vented solar panel with a reliable heat-sensing device and vent control system.

BRIEF SUMMARY OF THE INVENTION

This invention solves the problems and fills the needs mentioned above, providing an efficiently operating, practical vented solar panel. The solar panel of this invention has a reliable heat-sensing device and vent control system, which is totally sun-powered. The solar panel of this invention, particularly certain preferred embodiments, is a relatively low-cost and trouble-free device.

The invention includes the use of a in its place actuator as the control for all required venting gates in the panel. In a highly preferred embodiment, in its place actuator is in heat-transfer relation with the collector plate and controls gates at opposite ends of the air plenum by means of flexible force-transmitting linkages extending between the actuator and each of the gates.

The actuator and linkages serve to operate the gates simultaneously, to eliminate substantial problems and disadvantages of vented panels of the prior art. The wax thermal actuator generates sufficient force to operate two large gates extending substantially across the width of the panel at either end thereof even though the actuator is remote from the gates. The force-transmitting linkages must be flexible to accommodate dimensional variations in the panel between the actuator and the gates due to thermal expansion and contraction. Control cables (that is, sheathed mechanical cables such as bicycle cables), can accommodate great dimensional variations, making possible effective operation of gates which are remote from the actuator, even in panels having collector elements of highly expandable plastics.

In preferred embodiments of this invention, the gates are pivotable with respect to the remainder of the structure and operate as torque is applied by means of the linkages. A linkage is secured relative to its gate at a radial position near the axis of the pivot for the gate. This serves to amplify the gate-opening movement available from lineal movement of the linkage. It has been determined that wax thermal actuators have sufficient force to reliably move the gates in this manner through flexible linkages.

Certain preferred embodiments include one or more springs or other means to bias the gates toward the positions closing the air plenum. In such embodiments, the wax thermal actuator and linkages are arranged to pull the gates moving them toward the open (or venting) positions. Such biasing means, sometimes referred to herein as first biasing means, may be two or more separate springs or the like at the gates, but is preferably a single coil spring or the like arranged in relation with the actuator to act on the gates through the linkages. Some embodiments have, as an additional feature, second biasing means, which is(are) weaker than the first biasing means, to move the gates to the open venting position when the flexible force-transmitting linkages (between the elastomeric actuator and the gates) are disconnected or broken. The second biasing means serve(s) as a fail-safe system against overheating of panels should the linkages break.

The wax thermal actuator, which is in heat-transfer relation to the collector element, is preferably in heat-conductive relation thereto, either in direct contact therewith or through a preferably metallic module of which it is a part. When the collector overheats, the heat is conducted into the wax thermal actuator. When unacceptable temperatures are reached, the actuator will move with force, as will be more fully explained hereinafter, and act on the gates through the flexible linkages.

While major heat input to the wax thermal actuator may be by conduction, in some embodiments the actuator is part of a heat-sensing module which includes heat-transfer fins within the air plenum. The fins increase the amount of heat which may be transferred to or from the module by convection as air within the plenum contacts the module. With such an arrangement, actuation of the wax thermal actuator to open the vent gates can readily occur even though the portion of the solar panel including the module may be shaded. And, when the venting gates are open, the fins will facilitate cooling of the actuator, thus preventing the solar panel from cooling so much that efficient operation is impaired.

The increase in convective heat transfer is usually of greater importance when a plastic collector element is used, because of the lower thermal conductivity of plastics (compared to metal). The module itself, in most arrangements, shades a small portion of the collector, and conductive heat transfer from the hotter, unshaded portions of the collector to the module through the shaded portions of the collector in contact with the module would be somewhat limited. Thus, with the venting gates closed, circulation of hot stagnant air within the air plenum is an important means of heating the module and its wax thermal actuator.

In some preferred embodiments, the heat-sensing module may be adapted (such as by darkening its surface) for substantial absorption of solar radiation. This may be useful, particularly in solar panels having plastic collectors, for substantially the same reasons as mentioned above.

The heat-sensing module, when it is adapted to absorb solar radiation, has fins for convective heat transfer from the air plenum, and is in conductive heat-transfer relation to the collector, functions as a summing integrator of conductive, convective, and radiative heat transfer to the actuator. This arrangement functions well in sensing overheating at any portion of the solar panel and responding by ready venting and closing of vents when and to the extent required to protect the solar panel.

The heat-sensing module may be located on the collector plate at whatever point is deemed advantageous. However, the module is preferably located near the upper end of the solar panel, which is normally the hottest part of the panel.

OBJECTS OF THE INVENTION

It is the primary object of this invention to provide a vented solar panel overcoming problems and deficiencies of panels of the prior art.

Another object of this invention is to provide a vented solar panel which is totally sun-powered and thus not subject to power failure.

Another object of this invention is to provide a low-cost, glazed solar panel which is reliable in operation.

Yet another object of this invention is to provide a vented solar panel which remains substantially closed except when venting is required to counteract overheating.

Still another object of this invention is to provide a vented solar panel with a heat-sensing device which controls gates at opposite ends of the panel simultaneously.

Another object of this invention is to provide a vented solar panel having a single temperature-responsive control for two widely separated venting gates.

Yet another object of this invention is to provide a vented solar panel which allows cooling across substantially the entire width of the collector plate.

Still another object of this invention is to provide a vented solar panel with a temperature-responsive control having sufficient forcefulness to operate venting gates extending across the width of the panel.

A further object of this invention is to provide a vented solar panel having a temperature-responsive gate operator which undergoes substantial heat transfer by conduction, convection and radiation to overcome certain problems and provide reliable and efficient venting.

BRIEF DESCRIPTION OF THE DRAWINGS

These and other objects of the invention will be apparent from the following description of preferred embodiments wherein.

DESCRIPTION OF PREFERRED EMBODIMENTS

Figure 1:
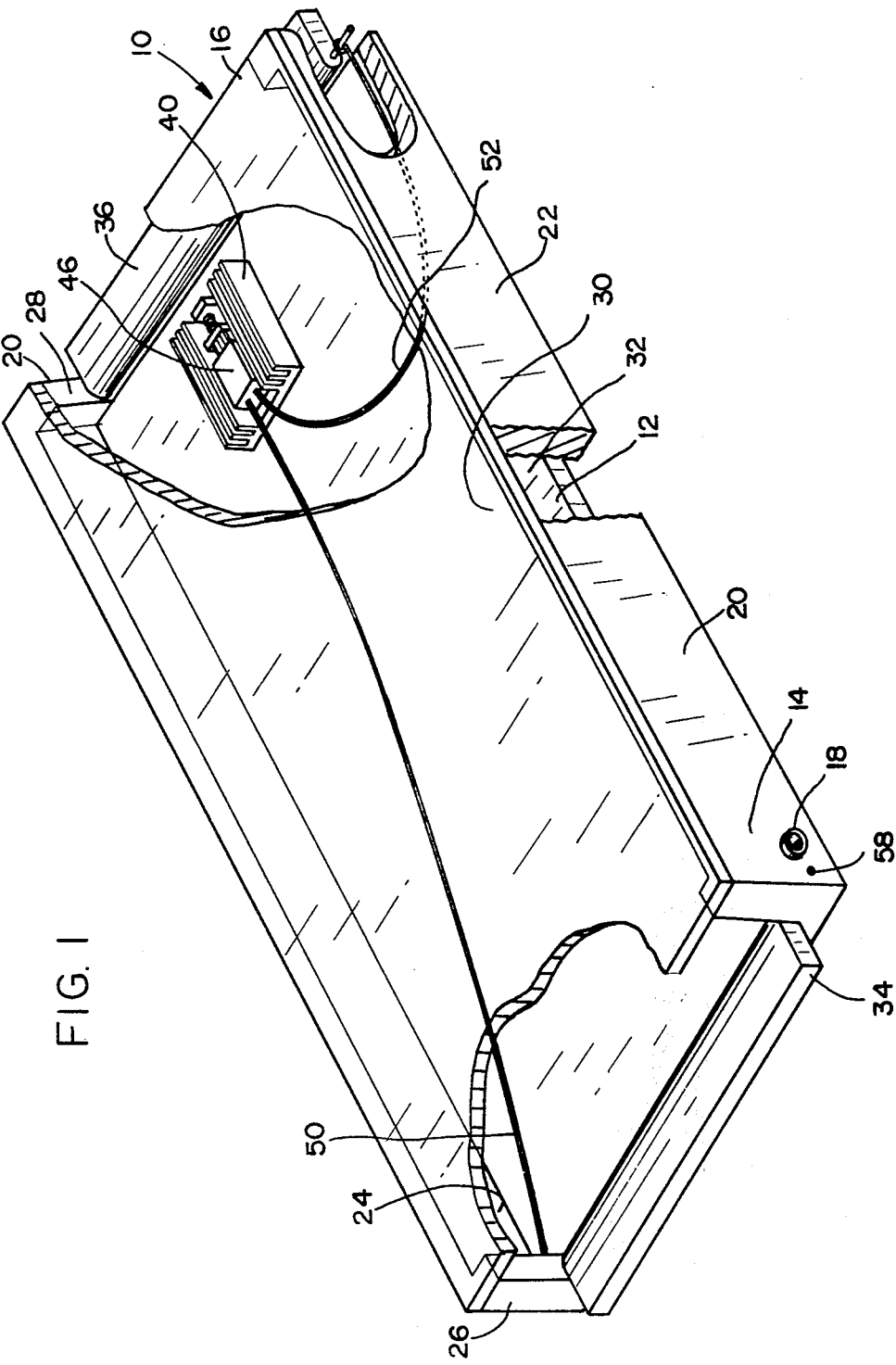
FIG. 1 is a partially cutaway perspective view of a solar panel according to this invention.

FIG. 1 illustrates a solar panel 10 according to this invention. Solar panel 10 includes a collector element 12 which is a flat rectangular plate extending across nearly the entire solar panel structure. Collector element 12 has working fluid conduits formed therein which are not shown. The conduits run parallel one to another from a first or lower end 14 of solar panel 10 to a second or upper end 16. The working fluid conduits are joined at either end in manifolds for circulation away from the panel for any desired purpose as previously mentioned. The manifold outlet 18 for lower end 14 is illustrated in FIG. 1; the manifold for upper end 16 is not shown.

Collector element 12 is mounted on a frame 20 which includes parallel side members 22 and 24, lower end member 26 and upper end member 28. All of the frame members 20 are suitably insulated. Extending across the top of frame 20 and spaced from collector element 12 is a solar radiation-transmitting cover 30, which is often referred to as a glazing. Cover 30 serves to isolate collector element 12 from the atmosphere, protecting it against unnecessary heat loss while allowing radiant heat to enter.

Cover 30 defines, with frame 20 and collector element 12, an air plenum 32. Under working conditions, the air in air plenum 32 does not circulate, but remains in place isolating and insulating collector element 12 from the atmosphere.

Figure 3:
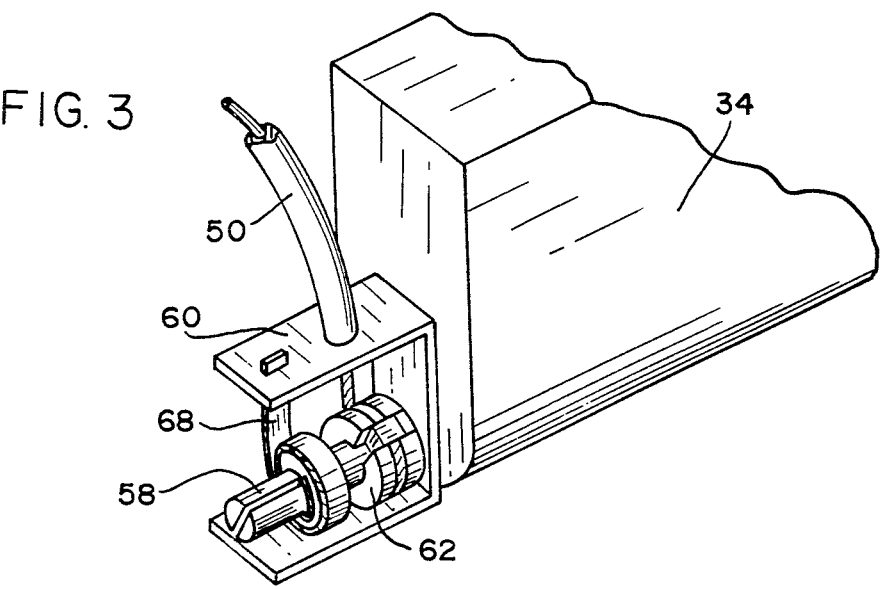
FIG. 3 is an enlarged, perspective view of FIG. 1, showing details of the gate-operating mechanism not shown in FIG. 1.

Lower end member 26 and upper end member 28 include gates 34 and 36, respectively. Each of gates 34 and 36 is pivotally movable about an axis defined by rotation pins, such as rotation pin 58 shown in FIG. 1. Gates 34 and 36 rotate with respect to the remaining portions of the end members of which they are a part. Gates 34 and 36 are movable between first positions closing air plenum 32 and second positions venting plenum 32. FIG. 1 illustrates the venting position, in which the gates are wide open. When the gates move through a 90° rotation from the positions illustrated in FIG. 1, the gates would close the air plenum thus ending venting therethrough. FIG. 3 shows gate 34 in the closed position.

Near to upper end member 28 and mounted in heat-conductive contact with collector element 32 is heat-sensing module 40. Module 40 is illustrated in detail in FIG. 2. Heat-sensing module 40 includes a base plate 42 in full contact with collector element 12 and a wax thermal actuator 46 resting on base plate 42. The wax thermal actuator is the heart of the control system for both gates 34 and 36.

Figure 4:
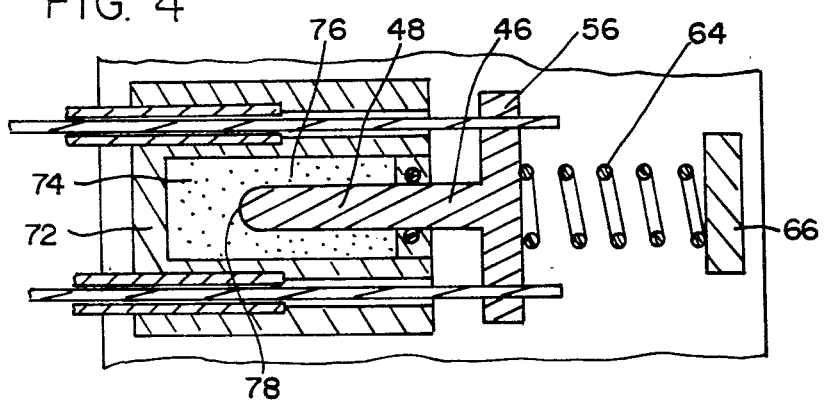
FIG. 4 is a sectional, partial top view of FIG. 2, illustrating that portion of the device when the solar panel is below a predetermined unacceptable temperature.
Figure 5:
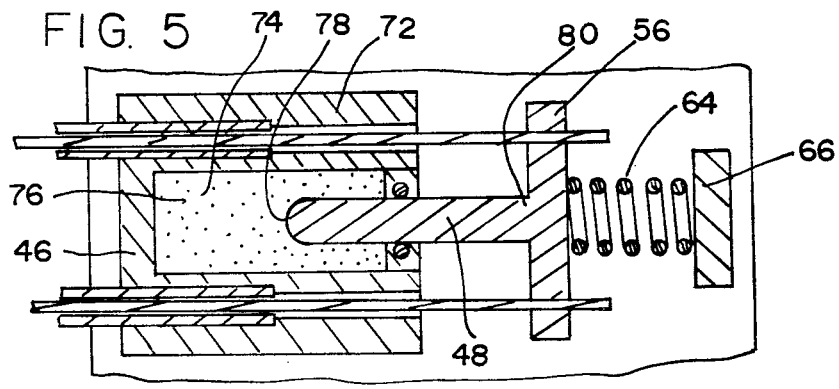
FIG. 5 is a view similar to FIG. 4, differing only in that it illustrates the device when the panel is at or above a predetermined unacceptable temperature.

As used herein, the term "wax thermal actuator" means a device which uses the change of volume of a material undergoing a reversible solid-liquid phase change to generate displacement of a piston (usually, a rod-like piston). Operation of a wax thermal actuator is illustrated in sufficient detail in FIGS. 4 and 5. Wax thermal actuator 46 includes a rigid metal block 72 which defines a chamber 74 filled with wax 76. Also in chamber 74 is a piston 48 including proximal end 78 in contact with wax 76 and distal end 80 extending outside chamber 74. In FIG. 4, wax 76 is in the solid state since its temperature is below the phase change range. In FIG. 5, all or some of the wax in chamber 74 has melted, and, consequently, increased in volume. By its increase in volume, the wax has displaced piston 48 outwardly, generating great force. When wax thermal actuator 46 and hence its wax have cooled, wax 76 will solidify, decreasing in volume and allowing piston 48 to be returned to some extent into chamber 74.

Wax thermal actuators may be obtained from a variety of sources. Such actuators are used in automobile cooling systems and in a variety of other applications, and may be obtained from the same suppliers used in such other cases. Wax thermal actuators which utilize materials having a variety of phase-change temperature ranges may be obtained. For example, wax can be formulated to melt at a temperature anywhere within the range of about 20° C. to 150° C. Usually, a wax mixture will melt at a chosen temperature or within perhaps 3° C. over or under such temprature. As melting occurs, piston 48 will be displaced by an amount proportional to the amount of wax melted. The phase-change material should be chosen with reference to a predetermined unacceptable temperature for the construction and materials chosen for the solar panel.

As previously indicated, the movement of piston 48 is accomplished with great force, and provides the work necessary to move gates 34 and 36 from the first or closed positions to the second or open positions simultaneously. The movement provided by actuator 46 is transmitted simultaneously to gates 34 and 36 by means of flexible force-transmitting linkages 50 and 52, respectively. The term "flexible force-transmitting linkage" as used herein means a linkage which can transfer the strong force of the wax thermal actuator to the gates and do so effectively in spite of dimensional variations between the actuator and the gates it controls. Such linkages include slack to accommodate changes in the distances between the actuator and the gate or gates it controls. When the distance is reduced there is increased slack; when the distance increases there is reduced slack. In the highly preferred embodiment shown in the drawings, linkages 50 and 52 are control cables. The term "control cable" as used herein refers to the sheathed coaxial mechanical cables commonly known as bicycle cables. A variety of other flexible force-transmitting linkages could be used effectively.

Figure 2:
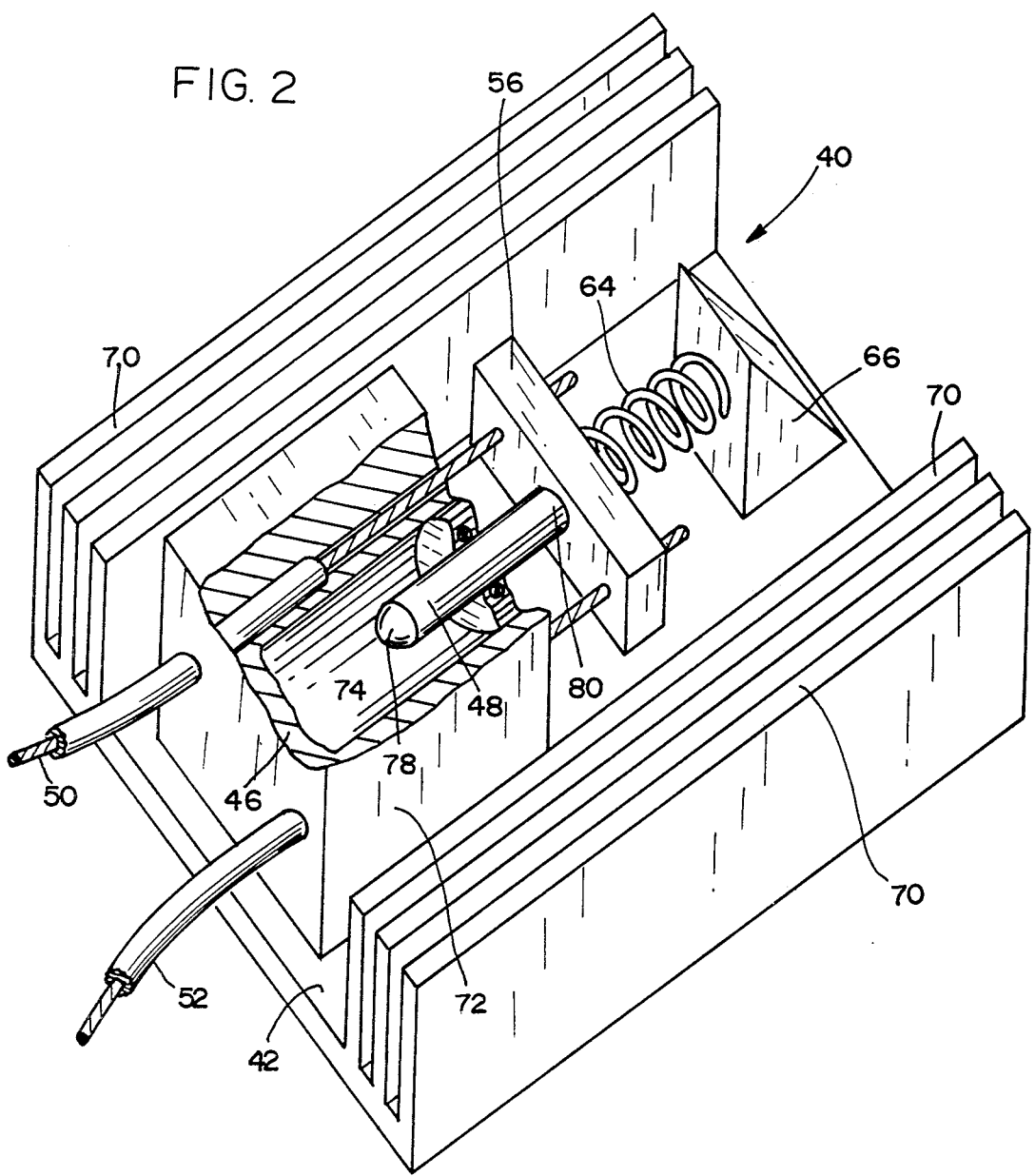
FIG. 2 is an enlarged, partially cutaway perspective view of a portion of the device of FIG. 1, specifically, the heat-sensing module.

As shown best in FIGS. 2, 4 and 5, the sheathings 54 of control cables 50 and 52 are secured to mounting block 72 at one end of each of the cables 50 and 52. The movable inner portion of cables 50 and 52 at that end are secured to a yoke 56 which is attached firmly to distal end 80 of piston 48. The other ends of cables 50 and 52 are secured relative to gates 34 and 36, respectively, and apply a torque thereto in a manner not shown fully in FIG. 1.

The connection of the cables with respect to the gates is fully illustrated in FIG. 3. As shown in that figure, cable 50 is secured relative to gate 34 at a radial position near the axis of pivot pin 58 such that linear movement of the inner portion of cable 50 is amplified in the gate-opening movement. Sheathing 54 of cable 50 is firmly attached to mounting bracket 60 which is secured in turn to a portion of lower end member 26 adjacent to gate 34. The extreme end of cable 50 at gate 34 is wrapped partially around a rotation drum 62 which is fixed to pivot pin 58.

When an unacceptably high temperature is reached, piston 48 of actuator 46 moves outwardly (to the right as shown in FIGS. 1, 2, 4 and 5), causing the inner portion of cable 50 to be moved such that it is effectively unwound from rotation drum 62 to cause gate 34 to open to the venting position shown in FIG. 1. At precisely the same time, the same action occurs with respect to cable 52 and gate 36 at upper end 28 of frame 20. (The structural details shown in FIG. 3 with respect to gate 34 are the same with respect to gate 36.) Thus, when the temperature becomes unacceptably hot, the gates open simultaneously to allow venting of solar panel 10 and consequent cooling.

After solar panel 10 has cooled sufficiently to cause the wax of actuator 46 to solidify, piston 48 and thus yoke 56 undergo return movement under the action of a return compression spring 64 which is compressed between yoke 56 and compression spring buttress 66. (This return movement is to the left as shown in FIGS. 1, 2, 4 and 5.) This causes return movement of cables 50 and 52 and operates to close gates 34 and 36. Referring to FIG. 3, the return movement causes, in effect, the rewinding of the inner portion of cable 50 onto rotation drum 52 and the consequent amplified closing movement of gate 34. Spring 64 forms the principal part of a first biasing means which urges gates 34 and 36 toward the positions closing air plenum 32. Wax thermal actuator 46, when heated, works against spring 64.

A torsion spring 68 is keyed at one end to pivot pin 58 and attached at the other end to mounting bracket 60. Torsion spring 68 serves as a fail-safe system to protect solar panel 10 from overheating in the event that cables 50 and/or 52 are disconnected or break. In such cases, torsion spring 68 would rotate pivot pin 58 and thus gate 34 to the open position, allowing venting of solar panel 10. A similar torsion spring fail-safe system is installed with respect to gate 36 at upper end of frame 20.

Elastomeric actuator 46 is in heat-conductive relation to collector element 12 by means of its contact therewith through base plate 42 of heat-sensing module 40. Module 40 includes heat-transfer fins 70 extending upwardly from base plate 42 in parallel, spaced relationship one to another. Fins 70 extend in a direction between lower end 26 and upper end 28 of panel 10. When gates 34 and 36 are open, a "chimney effect" air flow is established from gate 34 at the lower end of panel 10 to gate 36 at the upper end of panel 10. The flow is caused by the hot air within plenum 32 rising through gate 36 causing cooler air to be drawn into air plenum 32 through gate 34. This air flow will move between fins 70, thus increasing effective heat transfer with actuator 46. Fins 70 will also allow increased convective heat transfer when gates 34 and 36 are closed, as air circulates within air plenum 32. Thus, fins 70 provide the advantages described above.

Module 40 has its upper surface darkened or adapted in other known fashion to absorb substantial amounts of solar radiation. Heat-sensing module 40, therefore, functions as a summing integrator of conductive, convective, and radiative heat transfer. Each of these heat-transfer relationships is significant for the various reasons described above. Primary heat transfer to and from module 40, and thus actuator 46, can be by conduction from collector plate 12. However, the fins increasing convective heat transfer and the adaptation of module 40 to increase absorption of solar radiation are preferred for more reliable and efficient functioning of the solar panel venting system.

Collector element 12 of solar panel 10 is preferably made of a plastic such as polycarbonate, poly(2,6-dimethyl-1,4-phenylene oxide) (sold by General Electric Company under the trademark "Noryl"), polyethylene, polypropylene or acrylonitrile butadiene styrene. A plastic collector element 12 has certain cost advantages and the further advantages of being corrosion-free, unaffected by freezing, and compatible with present plumbing codes. Plastic collector plates may readily be extruded, thus contributing to their low cost when compared to higher-priced materials. However, plastic collector plates undergo substantial dimensional variations as temperature conditions vary. Thus, flexible force-transmitting linkages are particularly required in solar panels having the preferred plastic collector elements. Substantial dimensional changes may be easily tolerated by flexible force-transmitting linkages, particularly the control cables of the preferred embodiments.

The solar radiation-transmitting cover 30 may be made of a wide variety of transparent or translucent materials including various plastics, glass or any other material which serves to insulate collector element 12 from the atmosphere while allowing solar radiation to enter. Frame members 20, including gates 34 and 36, may be made of wood or various plastics or metal materials. Such frame members preferably have insulating qualities which prevent unnecessary heat loss during operation of the solar panel of this invention. The principal parts used in the solar panel are preferably chosen to be compatible in their coefficients of thermal expansion, to maintain structural integrity in the panel. Heat sensing module 40 is preferably made of aluminum or other highly conductive metals.

While in the foregoing specifications, this invention has been described in relation to certain preferred embodiments, and many details have been set forth for purpose of illustration, it will be apparent to those skilled in the art that the invention is susceptible to additional embodiments and that certain of the details described herein can be varied considerably without departing from the basic principles of the invention.

I claim:

1. In a solar panel of the type having a collector element, working fluid conduit means in heat transfer relation thereto, a cover spaced from the element and defining an air plenum adjacent to the element, and gates at opposite ends of the plenum movable between first positions closing the plenum and second positions venting the plenum, the improvement in venting means comprising:
   a wax thermal actuator in thermal transfer relation to the element; and
   force-transmitting linkage means between the actuator and each of the gates for moving the gates between said first and second positions, the linkage means including slack to accommodate changes in the distances between the actuator and the gates, whereby the gates are operable simultaneously and without regard to thermal expansion and contraction of the collector element.

2. The device of claim 1 wherein the linkage means comprise control cables.

3. The device of claim 1 wherein the collector element is of plastic.

4. The device of claim 3 wherein the linkage means comprise control cables.

5. The device of claim 4 further comprising first means biasing the gates toward said first positions closing said plenum, and wherein the actuator acts through the linkage means to move the gates toward said second positions venting the plenum in response to a predetermined unacceptable temperature condition.

6. The device of claim 5 wherein said first biasing means acts on the gates through said linkage means.

7. The device of claim 1 wherein the panel is generally rectangular and the gates are along substantially the entire width of the panel at said opposite ends.

8. The device of claim 1 wherein each of the gates is pivotable and torque is applied thereto by said linkage means.

9. The device of claim 8 wherein each linkage means is secured relative to its gate at a radial position near the axis of the pivot for such gate, whereby to amplify the gate-opening movement available from lineal movement of such linkage means.

10. The device of claim 9 wherein the panel is generally rectangular and the gates are along substantially the entire width of the panel at said opposite ends.

11. The device of claim 10 wherein the linkage means comprise control cables.

12. The device of claim 1 further comprising first means biasing the gates toward said first positions closing said plenum, and wherein the actuator acts through the linkage means to move the gates toward said second positions venting the plenum in response to a predetermined unacceptable temperature condition.

13. The device of claim 12 wherein said first biasing means acts on the gates through said linkage means.

14. The device of 12 wherein the panel is generally rectangular and the gates are along substantially the entire width of the panel at said opposite ends.

15. The device of claim 14 wherein the linkage means comprise control cables.

16. The device of claim 13 wherein the panel is generally rectangular and the gates are along substantially the entire width of the panel at said opposite ends.

17. The device of claim 16 wherein the linkage means comprise control cables.

18. The device of claim 1 wherein the actuator is in heat-conductive relation to the collector element.

19. The device of claim 18 wherein the actuator is part of a heat-sensing module including heat-transfer fins within the plenum, whereby to increase convective heat transfer with the actuator.

20. The device of claim 19 wherein said module has a surface adapted for substantial absorption of solar radiation, whereby the module functions as a summing integrator of conductive, convective, and radiative heat transfer.

21. The device of claim 1 wherein the actuator is part of a heat-sensing module including heat-transfer fins within the plenum, whereby to increase convective heat transfer with the actuator.

22. The device of claim 21 wherein said module has a surface adapted for substantial absorption of solar radiation.

23. In a solar panel of the type having a collector element, a cover spaced from the element and defining an air plenum adjacent to the element, and gates at opposite ends of the plenum movable between first positions closing the plenum and second positions venting the plenum, the improvement comprising:
   a wax thermal actuator in thermal transfer relation to the element;
   flexible force-transmitting linkages between the actuator and each of the gates for moving the gates simultaneously between the first and second positions;
   first biasing means to bias the gates, through the linkages, toward said first positions closing the plenum, said actuator operable through the linkages to move the gates toward said second positions venting the plenum in response to a predetermined unacceptable temperature condition; and
   second biasing means to bias the gates to the second positions when the linkages are disconnected from the gates.

24. In a solar panel of the type having a collector element, a cover spaced from the element and defining an air plenum adjacent to the element, and gates at opposite ends of the plenum movable between first positions closing the plenum and second positions venting the plenum, the improvement comprising:
   a wax thermal actuator in thermal transfer relation to the element;
   said collector element being of plastic;
   flexible control cables between the actuator and each of the gates for moving the gates simultaneously between the first and second positions;
   first biasing means to bias the gates, through the cables, toward said first positions closing the plenum, said actuator operable through the cables to move the gates toward said second positions venting the plenum in response to a predetermined unacceptable temperature condition; and
   second biasing means to bias the gates to the second positions when the cables are disconnected from the gates.

25. The device of claim 24 wherein the panel is generally rectangular and the gates are along substantially the entire width of the panel at said opposite ends.

26. The device of claim 25 wherein each of the gates is pivotable and torque is applied thereto by means of said linkages.

27. The device of claim 26 wherein each linkage is secured relative to its gate at a radial position near the axis of the pivot for such gate, whereby to amplify the gate-opening movement available from lineal movement of such linkage.

28. The device of claim 27 wherein the actuator is in heat-conductive relation to the collector element.

29. The device of claim 28 wherein the actuator is part of a heat-sensing module including heat-transfer fins within the plenum, whereby to increase convective heat transfer with the actuator.

30. The device of claim 29 wherein said module has a surface adapted for substantial absorption of solar radiation, whereby said module functions as a summing integrator of conductive, convective, and radiative heat transfer.

31. In a solar panel of the type having a collector element, working fluid conduit means in heat transfer relation thereto, a light-transmissive cover spaced from the collector element and defining an air plenum adjacent to the element, and gates at opposite ends of the plenum each movable between a first position closing the plenum and a second position venting the plenum, the improvement in venting means comprising:
    wax thermal actuator means in thermal transfer relation to the element and spaced from said gates; and
    force-transmitting linkage means between the actuator means and said gates for moving said gates between their first and second positions, the linkage means including slack to accommodate changes in the distance between the actuator means and said gates, whereby said gates are operable without regard to thermal expansion and contraction of the collector element.

32. The device of claim 31 wherein the linkage means comprises control cable.

33. The device of claim 31 wherein the actuator means and the collector element are in heat-conductive relation.

34. The device of claim 33 further comprising a heat-sensing module including the actuator means and having heat-transfer fins within the plenum, whereby to increase convective heat transfer with the actuator means.

35. The device of claim 34 wherein said module has a surface adapted for substantial absorption of solar radiation, whereby the module functions as a summing integrator of conductive, convective, and radiative heat transfer.

36. The device of claim 31 further comprising means biasing the gates toward said first positions, and wherein the gates are movable toward said second positions by the actuator means in response to a predetermined unacceptable temperature condition.

37. The device of claim 36 wherein the panel is generally rectangular and the gates are along substantially the entire width of the panel at opposite ends thereof.

38. The device of claim 36 further comprising additional biasing means to bias the gates to said second positions when the linkage means are disconnected from the gates.

39. In a solar panel of the type having a collector element, working fluid conduit means in heat transfer relation thereto, a light-transmissive cover spaced from the collector element and defining an air plenum adjacent to the element, and at least one gate movable between a first position closing the plenum and a second position venting the plenum, the improvement in venting means comprising:
    a wax thermal actuator in thermal tranfer relation to the element and spaced from at least one said gate;
    force-transmitting linkage means between the actuator and said gate for moving said gate between the first and second positions, the linkage means including slack to accommodate changes in the distance between the actuator and said gate, whereby said gate is operable without regard to thermal expansion and contraction of the collector element;
    first biasing means to bias said gate toward said first position, said actuator operable to move said gate toward said second position in response to a predetermined unacceptable temperature condition; and
    second biasing means to bias said gate to said second position when the linkage means is disconnected from said gate.

* * * * *